(12) United States Patent
Lee et al.

(10) Patent No.: US 6,981,296 B2
(45) Date of Patent: *Jan. 3, 2006

(54) HINGE APPARATUS FOR MOBILE PHONES

(75) Inventors: Ta-Kyeong Lee, Suwon-si (KR);
Ki-Yeong Lee, Yongin-si (KR);
Yeong-Ok Jeong, Suwon-si (KR)

(73) Assignee: Samsung Electro-Mechanics Co., Ltd., Kyunggi-do (KR)

( * ) Notice: Subject to any disclaimer, the term of this patent is extended or adjusted under 35 U.S.C. 154(b) by 70 days.

This patent is subject to a terminal disclaimer.

(21) Appl. No.: 10/648,100

(22) Filed: Aug. 26, 2003

(65) Prior Publication Data

US 2004/0154130 A1  Aug. 12, 2004

(30) Foreign Application Priority Data

Feb. 10, 2003 (KR) ...................... 10-2003-0008296

(51) Int. Cl.
*E05D 11/10* (2006.01)

(52) U.S. Cl. ....................................................... 16/330

(58) Field of Classification Search ................. 16/330, 16/280, 284, 325, 353, 340–343, 303; 361/801–804; 379/433.11–433.13, 433, 434, 438; 403/83, 403/84, 113–120; 455/90, 550, 556, 575
See application file for complete search history.

(56) References Cited

U.S. PATENT DOCUMENTS

| 6,115,886 | A  | * | 9/2000  | Fujita ........................... 16/330 |
| 6,256,481 | B1 | * | 7/2001  | Jeong et al. ............. 455/575.3 |
| 6,745,436 | B2 | * | 6/2004  | Kim ............................. 16/330 |
| 6,751,488 | B2 | * | 6/2004  | Lee ......................... 455/575.3 |
| 6,785,935 | B2 | * | 9/2004  | Ahn et al. ..................... 16/221 |
| 2004/0203522 | A1 | * | 10/2004 | Lim .......................... 455/90.3 |

FOREIGN PATENT DOCUMENTS

| JP | 2002-70834 | * | 3/2000 |
| KR | 2003-29189 |   | 4/2003 |

* cited by examiner

*Primary Examiner*—Robert J. Sandy
*Assistant Examiner*—Andre' L. Jackson
(74) *Attorney, Agent, or Firm*—Gottlieb, Rackman & Reisman, P.C.

(57) ABSTRACT

The object of this invention is to provide a hinge apparatus for mobile phones. In the hinge apparatus, a fixed cam is installed in a rotary hinge part, in place of a fixed hinge part, different from conventional hinge apparatuses. Therefore, the design of elements of the hinge apparatus can be preferably changed so as to allow the elements to be easily and simply assembled into a single structure without being scratched. It is thus possible to minimize wobble of the hinge apparatus due to scratches of the elements, and prevent a degradation in the operational performance of the hinge apparatus caused by the wobble.

4 Claims, 12 Drawing Sheets

HINGE APPARATUS FOR MOBILE PHONES

BACKGROUND OF THE INVENTION

1. Field of the Invention

The present invention relates, in general, to a hinge apparatus for mobile phones and, more particularly, to a hinge apparatus for mobile phones, with a fixed cam installed in a rotary hinge part of the hinge apparatus, in place of a fixed hinge part of the apparatus, different from conventional hinge apparatuses, so that the design of elements of the hinge apparatus can be preferably changed so as to allow the elements to be easily and simply assembled into a single structure without being scratched, thus minimizing wobble of the hinge apparatus due to scratches of the elements and preventing a degradation in the operational performance of the hinge apparatus caused by the wobble.

2. Description of the Prior Art

As well known to those skilled in the art, conventional mobile phones are classified into flip-type phones with a hinged cover covering a variety of buttons of a main body, and folding-type phones with a folding main body. In accordance with the recent trend toward smallness and compactness of mobile phones, the folding-type phones have become more widely used than the flip-type phones.

FIG. 1 is a perspective view of a typical folding-type mobile phone. As shown in the drawing, the typical folding-type mobile phone is comprised of a main body 1 and a fold 2. The main body 1 has a microphone and a variety of buttons, and houses therein a variety of elements used for signal transmission and reception. A rechargeable battery used as a power source of the mobile phone is detachably mounted to the back of the main body 1.

The fold 2 is hinged to the main body 1 through a hinge apparatus so that the fold 2 is rotated around the hinge apparatus toward or away from the main body 1 to be closed or opened.

Such folding-type mobile phones are typically provided with a manual fold rotating mechanism designed to allow a user to manually open or close the fold relative to the main body. Nowadays, some models with a motor-operated fold rotating mechanism capable of automatically opening or closing the fold relative to the main body using a motor as well as allowing a user to manually open or close the fold as desired to enhance the convenience of users and functions of the phones have been proposed and used. Hinge apparatuses 10 for mobile phones with such motor-operated fold rotating mechanisms are so-called "manual/automatic hinge apparatuses".

FIG. 2 is a sectional view of a conventional manual/automatic hinge apparatus installed in a folding-type mobile phone. As shown in the drawing, the conventional manual/automatic hinge apparatus 10 designed to allow a user to manually or automatically open or close a fold 2 relative to a main body 1 is comprised of a rotary hinge part 20 integrally provided at the fold 2, and two fixed hinge parts 30 and 31 integrally provided at the main body 1. The rotary hinge part 20 is hinged at both ends thereof to the two fixed hinge parts 30 and 31.

The rotary hinge part 20 of the hinge apparatus 10 has a motor-operated fold rotating mechanism which is set in a housing 21 and is used for automatically opening or closing the fold 2 relative to the main body 1 as desired. The motor-operated fold rotating mechanism is comprised of a power generating unit for generating a rotating drive force, a power transmission unit for selectively engaging with the power generating unit, and an elastic support member for applying an elastic biasing force to the power transmission unit to selectively engage or disengage the power transmission unit with or from the power generating unit in response to an external force applied to the fold by a user.

The power generating unit generates a rotating drive force to rotate the fold 2 relative to the main body 1 in either direction, and is comprised of a motor 22 for generating the rotating drive force, and a reduction gear assembly 23 for transmitting the rotating drive force of the motor 22 while lowering the rotating speed.

In a detailed description, the motor 22 is connected to a signal output unit (not shown) externally provided at a predetermined portion of the main body 1, and is turned on by electricity applied from a rechargeable battery attached to the back of the mobile phone in response to a signal outputted from the signal output unit. The motor 22 thus generates an opposite directional rotating force.

The reduction gear assembly 23 is assembled with an output shaft of the motor 22, and transmits the rotating drive force of the motor 22 to the power transmission unit while lowering the rotating speed at a predetermined ratio. The reduction gear assembly 23 is comprised of a plurality of planetary gears (not shown). In the reduction gear assembly 23, the planetary gears are assembled to have a predetermined reduction ratio, and function to prevent undesired reverse rotation of the reduction gear assembly 23, in addition to lowering the rotating speed.

Therefore, in an automatic operation of the hinge apparatus 10, the rotating drive force of the motor 22 of the power generating unit is transmitted from the output shaft of the motor 22 to the power transmission unit while the rotating speed is lowered by the planetary gears of the reduction gear assembly 23.

The power transmission unit is comprised of a rotary cam 24 and a fixed cam 25. The rotary cam 24 is housed in the housing 21, and is connected to the reduction gear assembly 23 via a shaft. The rotary cam 24 is also tapered at an end thereof such that the central portion of the end of the rotary cam 24 becomes flat and projects toward the fixed cam 25, thus forming a tapered projection.

The fixed cam 25 is received in the second fixed hinge part 31 while being biased toward the rotary cam 24 by the elastic support member 40. The fixed cam 25 has a depression tapered at opposite side surfaces thereof. During an automatic fold rotating mode of the hinge apparatus, the rotary and fixed cams 24 and 25 come into frictional engagement with each other due to the elastic biasing force of the elastic support member.

The elastic support member 40 preferably comprises a compression coil spring made of a material having both high elastic strain and high restoring force. The elastic support member 40 is set in a cavity of the second fixed hinge part 31 such that a first end of the elastic support member 40 is stopped by an end wall of the cavity, and a second end is stopped by an end of the fixed cam 25.

The elastic biasing force of the elastic support member 40 is higher than the rotating drive force of the power generating unit. Since the elastic support member 40 having such a high elastic biasing force biases the power transmission unit in a direction, the rotary and fixed cams 24 and 25 of the power transmission unit may engage with or disengage from each other.

The two fixed hinge parts 30 and 31 are integrally formed at corners of the hinged end of the main body 1. In order to accomplish a hinged connection of one end of the rotary hinge part 20 to the first fixed hinge part 30, a hinge sleeve 32 is inserted into the first fixed hinge part 30. In addition, the fixed cam 25 is inserted into the second fixed hinge part 31 while being biased toward the rotary cam 24 by the elastic support member 40, as described above.

When the fold 2 is assembled with the main body 1 into a single structure by the hinge apparatus, both ends of the rotary hinge part 20 are hinged to the two fixed hinge parts 30 and 31, respectively. That is, the housing 21 of the rotary hinge part 20 is primarily assembled with the hinge sleeve 32 of the first fixed hinge part 30, so that the first end of the rotary hinge part 20 is hinged to the first fixed hinge part 30.

Thereafter, the second end of the rotary hinge part 20 is hinged to the second fixed hinge part 31. In such a case, the fixed cam 25 is primarily inserted into the second fixed hinge part 31 by the use of a fixed cam compressing device (not shown). Due to the fixed cam compressing device, the fixed cam 25 is maintained in the second fixed hinge part 31 while compressing the elastic support member 40. After the fixed cam 25 is inserted into the second fixed hinge part 31 by the use of the fixed cam compressing device, the rotary hinge part 20 is horizontally aligned with the second fixed hinge part 31 such that the second end of the rotary hinge part 20 is fitted over and assembled with the second fixed hinge part 31. Thereafter, the fixed cam compressing device is removed from the fixed cam 25, so that the fixed cam 25 is elastically pushed toward the rotary can 24 by the elastic support member 40 and the rotary and fixed cams 24 and 25 come into frictional engagement with each other. The fold 2 is thus completely assembled with the main body 1 into a single structure by the hinge apparatus.

However, the above-mentioned hinge apparatus is problematic as follows. That is, when the rotary hinge part 20 is horizontally aligned with the second fixed hinge part 31 such that the second end of the rotary hinge part 20 is assembled with the second fixed hinge part 31, the second end of the rotary hinge part 20 scratches the interior surface of the second fixed hinge part 31. The scratches on the second fixed hinge part 31 cause wobble of the rotary cam 24 and the motor of the power generating unit, thus degrading the operational performance of the hinge apparatus due to the wobble.

In addition, it is necessary to compress the fixed cam 25 by the use of a fixed cam compressing device until the second end of the rotary hinge part 20 is horizontally aligned with the second fixed hinge part 31. Therefore, the second end of the rotary hinge part 20 often interferes with the second fixed hinge part 31 during a process of assembling the hinge apparatus, so that it is difficult to assemble the hinge apparatus.

Furthermore, since both the elastic support member 40 and the fixed cam 25 are installed in the second fixed hinge part 31, it is almost impossible to provide mobile phones having a variety of designs which are accomplished by a change in the design of the second fixed hinge part 31. For example, the two fixed hinge parts provided in a hinge apparatus of a mobile phone shown in FIG. 3 have a smoothly rounded appearance to be attractive to users, thereby attracting users' attention. However, the second fixed hinge part 31 of the conventional hinge apparatus must define a large space so as to receive both the elastic support member 40 and the fixed cam 25 therein, so that the second fixed hinge part 31 does not allow mobile phone manufacturers to provide mobile phones having a variety of new designs which are accomplished by a change in the design of the second fixed hinge part 31.

Another disadvantage of the conventional hinge apparatus for mobile phones resides in that the elastic biasing force of the elastic support member 40 is applied to the fixed cam 25 and to the rotary cam 24 engaging with the fixed cam 25, and the transmitted biasing force is, thereafter, applied to the hinge sleeve 32 of the first fixed hinge part 30 through the housing 21 of the rotary hinge part 20, thus enlarging the gap between the rotary hinge part 20 and the first fixed hinge part 30 to wider than a predetermined reference gap.

SUMMARY OF THE INVENTION

Accordingly, the present invention has been made keeping in mind the above problems occurring in the prior art, and an object of the present invention is to provide a hinge apparatus for mobile phones, with a fixed cam installed in a rotary hinge part of the hinge apparatus, in place of a fixed hinge part of the apparatus, different from conventional hinge apparatuses, so that the design of elements of the hinge apparatus can be preferably changed so as to allow the elements to be easily and simply assembled into a single structure without being damaged, thus preventing a degradation in the operational performance of the hinge apparatus due to damage to the elements.

Another object of the present invention is to provide a hinge apparatus for mobile phones, in which the rotary hinge part does not interfere with a fixed cam compressing device during a process of assembling the rotary hinge part with a second fixed hinge part, so that it is easy and simple to assemble the hinge apparatus.

A further object of the present invention is to provide a hinge apparatus for mobile phones, which minimizes scratches caused by interference between the elements of the hinge apparatus during the process of assembling the rotary hinge part with the second fixed hinge part.

Still another object of the present invention is to provide a hinge apparatus for mobile phones, which may have a variety of designs due to flexibility in the design of fixed hinge parts.

In order to accomplish the above objects, an embodiment of the present invention provides a hinge apparatus for connecting a fold and a main body of a mobile phone to each other, comprising: a fixed hinge part provided at the main body; and a rotary hinge part provided at the fold and hinged to the fixed hinge part so to be rotated relative to the fixed hinge part, the rotary hinge part comprising: a power generating unit generating a rotating drive force; a rotary cam and a fixed cam selectively performing power transmission of the rotating drive force of the power generating unit; a camshaft assembled with the fixed cam such that the camshaft and the fixed cam are axially movable relative to each other, the camshaft being connected at an end thereof to the fixed hinge part such that an idle rotation of the camshaft relative to the fixed hinge part is prevented; and an elastic biasing member provided in the camshaft to elastically bias the fixed cam and the camshaft in opposite directions.

Another embodiment of the present invention provides a hinge apparatus for connecting a fold and a main body of a mobile phone to each other, comprising: a fixed hinge part provided at the main body; and a rotary hinge part provided at the fold and hinged to the fixed hinge part so to be rotated relative to the fixed hinge part, the rotary hinge part comprising: a power generating unit generating a rotating drive force; a coupling unit receiving the rotating drive force of the power generating unit; a rotary cam assembled with the coupling unit such that the rotary cam and the coupling unit are axially movable relative to each other, but are prevented from idly rotating relative to each other; a fixed cam engaging with or disengaging from the rotary cam, and assembled at an end thereof with the fixed hinge part such that the fixed cam is prevented from idly rotating relative to the fixed hinge part; and an elastic biasing member provided in the coupling unit to elastically bias the rotary cam and the coupling unit in opposite directions.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
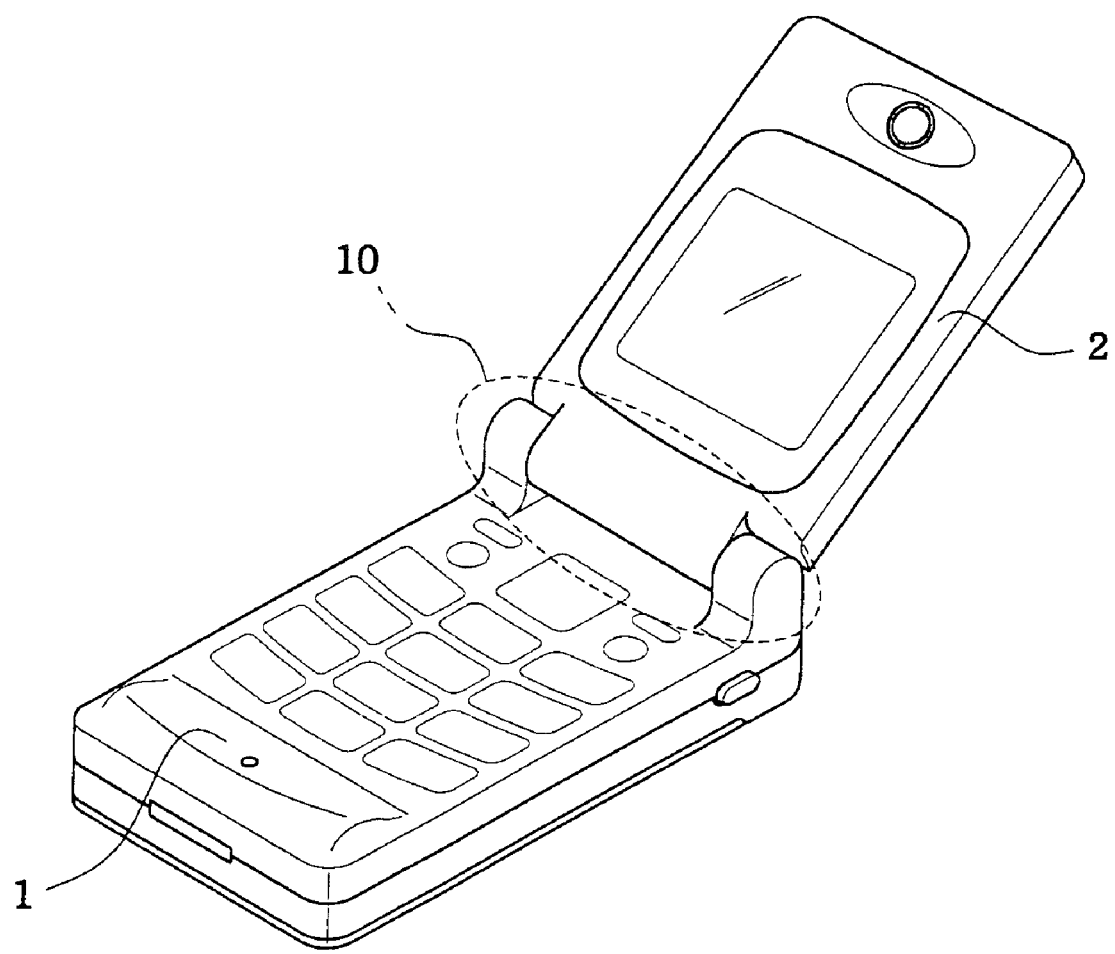
FIG. 1 is a perspective view of a typical folding-type mobile phone.
Figure 2:
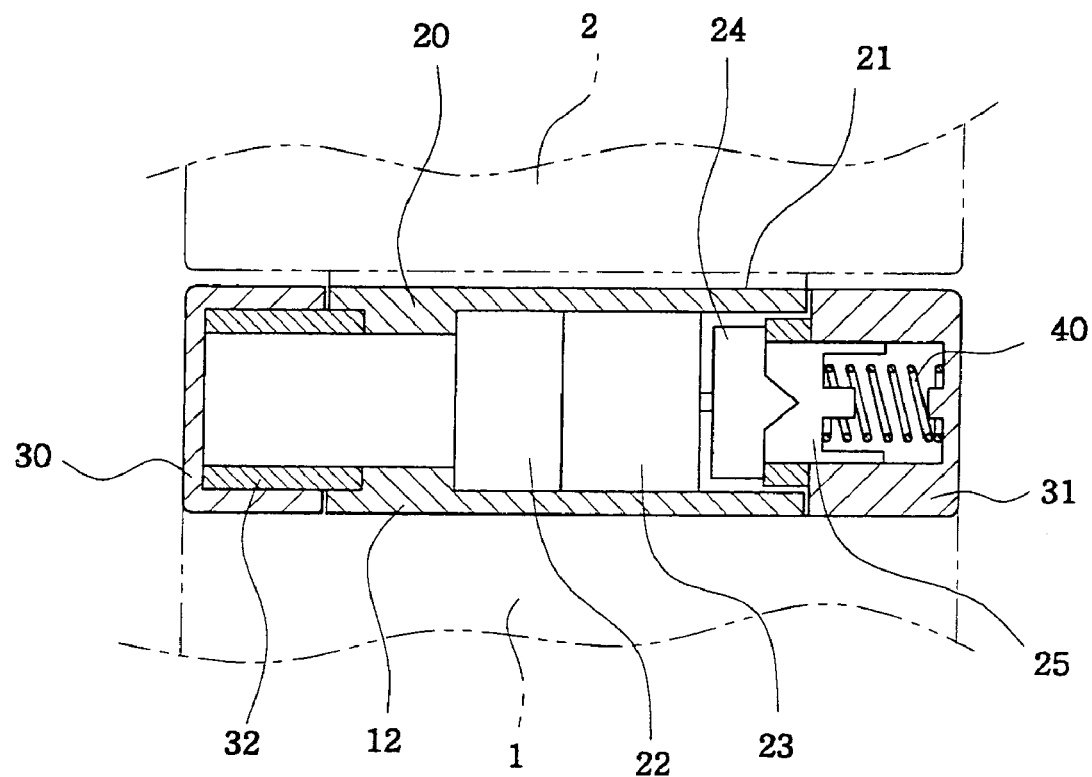
FIG. 2 is a sectional view of a conventional manual/automatic hinge apparatus for the typical folding-type mobile phones.

Reference should now be made to the drawings, in which the same reference numerals are used throughout the different drawings to designate the same or similar components.

Figure 4:
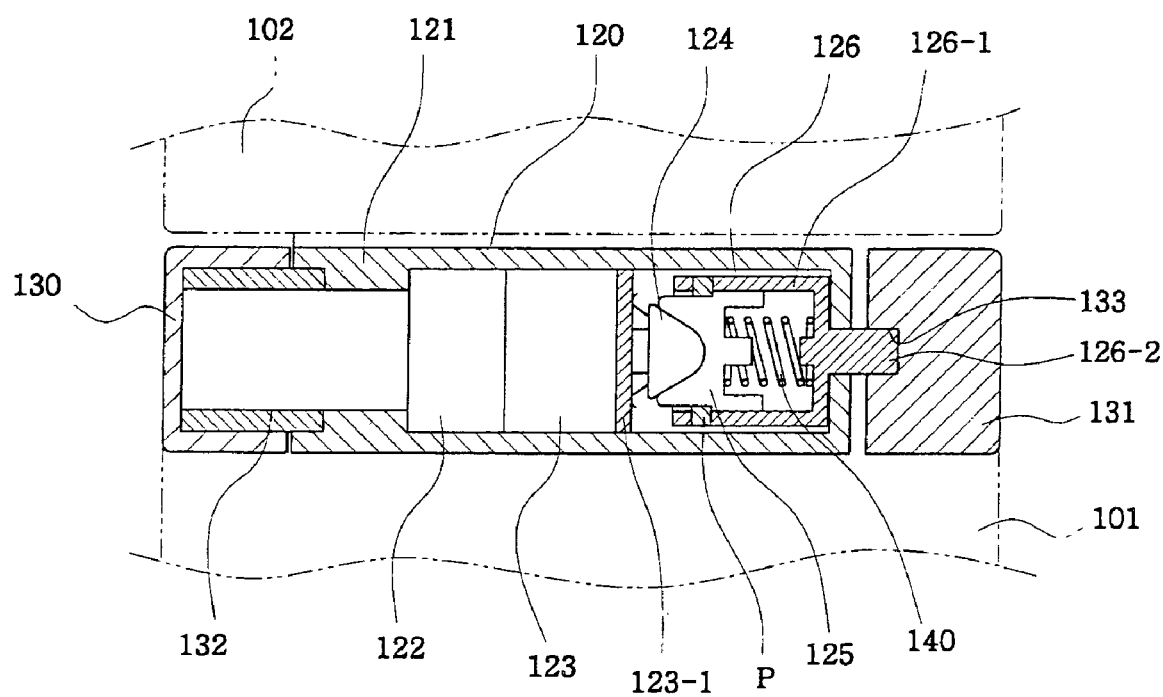
FIG. 4 is a sectional view of a hinge apparatus for folding-type mobile phones, according to a first embodiment of the present invention.
Figure 5:
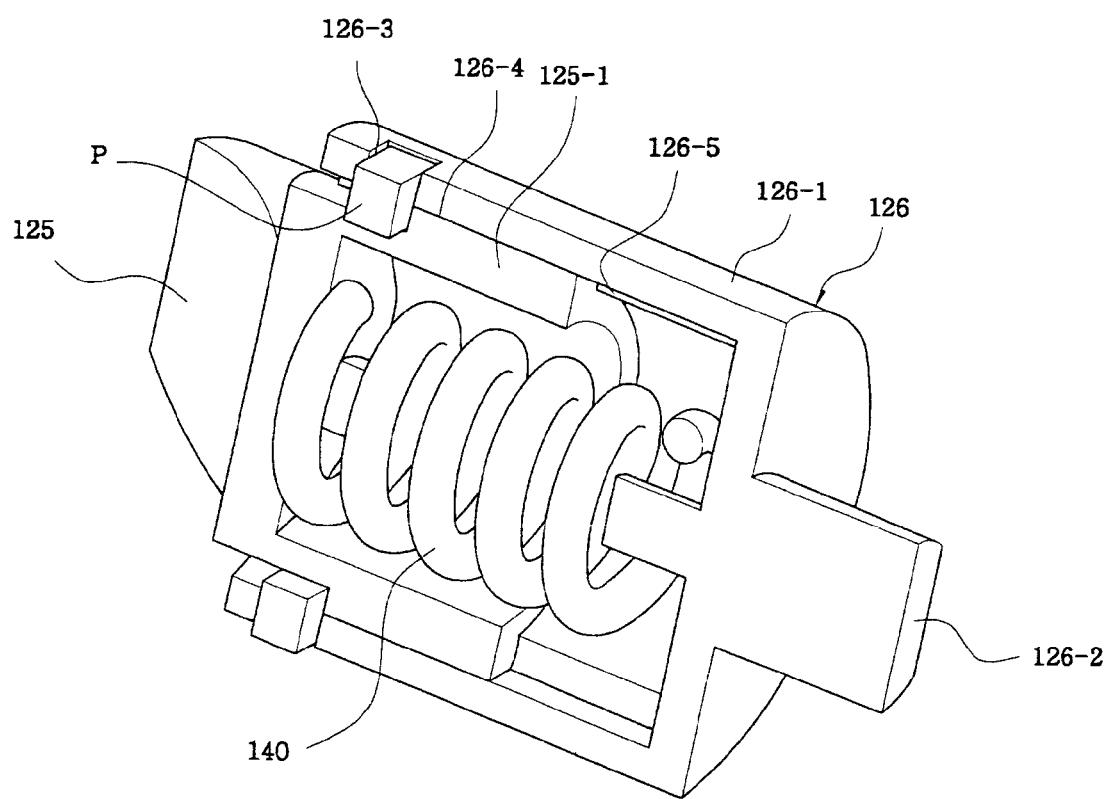
FIG. 5 is a sectional perspective view showing the construction and operation of a fixed cam and a camshaft assembled with each other in the hinge apparatus of FIG. 4.

FIG. 4 is a sectional view of a hinge apparatus for folding-type mobile phones, according to a first embodiment of the present invention. FIG. 5 is a sectional perspective view showing the construction and operation of a fixed cam and a camshaft assembled with each other in the hinge apparatus of FIG. 4.

As shown in the drawing, the hinge apparatus for folding-type mobile phones according to the present invention is comprised of a rotary hinge part 120 provided at an end of a fold 102 of a folding-type mobile phone, and two fixed hinge parts 130 and 131 provided at corners of an end of a main body 101 of the mobile phone. The rotary hinge part 120 of the fold 102 is hinged to the two fixed hinge parts 130 and 131 of the main body 101 so as to accomplish a folding structure of the mobile phone.

In a detailed description, the two fixed hinge parts 130 and 131 are formed at the corners of the end of the main body 101. The lateral thickness of each of the two fixed hinge parts 130 and 131 and the interval between the two fixed hinge parts 130 and 131 are very important factors which determine the width of the mobile phone. A hinge sleeve 132 is inserted into the first fixed hinge part 130 so as to accomplish a hinged connection of one end of the rotary hinge part 120 to the first fixed hinge part 130. The second fixed hinge part 131 receives a boss shaft 126b of a camshaft 126 in a boss shaft receiving slot 133 thereof. In such a case, since the boss shaft 126-2 of the camshaft 126 has a noncircular cross-section, as will be described later herein, the boss shaft receiving slot 133 of the second fixed hinge part 131 has a cross-section corresponding to that of the boss shaft 126-2.

The rotary hinge part 120 is provided at the end of the fold 102, and is hinged to the two fixed hinge parts 130 and 131 of the main body 101 so as to be manually or automatically rotated relative to the two fixed hinge parts 130 and 131 within a predetermined rotating angle.

The rotary hinge part 120 of the hinge apparatus has a motor-operated fold rotating mechanism which is set in a housing 121 and is used for automatically opening or closing the fold 102 relative to the main body 101 as desired. The motor-operated fold rotating mechanism is comprised of a power generating unit, a rotary cam 124, a fixed cam 125, the camshaft 126, and an elastic biasing member 140. The power generating unit generates a rotating drive force, while the rotary cam 124 is coupled to the power generating unit to receive the rotating drive force from the power generating unit. The fixed cam 125 engages or disengages with or from the rotary cam 124, so that the two cams 124 and 125 selectively cooperate with each other. The camshaft 126 is comprised of a boss 126-1 integrated with the boss shaft 126-2. The boss 126-1 is assembled with the fixed cam 125 such that the boss 126-1 is axially moved relative to the fixed cam 125. The boss shaft 126-2 is received in the boss shaft receiving slot 133 formed at the inside end of the second fixed hinge part 131, so that a rotation of the fixed cam 125 is prevented. The rotary cam 124, the fixed cam 125 and the camshaft 126 constitute a power transmission unit of the fold rotating mechanism. The elastic biasing member 140 is installed in a cavity of the camshaft 126 so as to elastically bias the fixed cam 125 and the camshaft 126 in opposite directions.

The power generating unit generates the rotating drive force to automatically rotate the fold 102 relative to the main body 101 in either direction during an automatic fold rotating mode of the hinge apparatus. The power generating unit is comprised of a motor 122 for generating the rotating drive force, and a reduction gear assembly 123 for transmitting the rotating drive force of the motor 122 while lowering the rotating speed.

In a detailed description, the motor 122 is electrically connected to a signal output unit (not shown) provided at a predetermined portion of the main body 101, and is turned on by electricity applied from a rechargeable battery attached to the back of the mobile phone in response to a signal outputted from the signal output unit. The motor 122 thus generates an opposite directional rotating force.

The reduction gear assembly 123 is assembled with an output shaft of the motor 122, and transmits the rotating drive force of the motor 122 to the rotary cam 124 while lowering the rotating speed at a predetermined ratio. The reduction gear assembly 123 is comprised of a plurality of planetary gears (not shown). In the reduction gear assembly 123, the planetary gears are assembled to have a predetermined reduction ratio, and function to prevent undesired reverse rotation of the reduction gear assembly 123, in addition to lowering the rotating speed.

The rotary cam 124 is connected at a first end thereof to the power generating unit via a shaft so as to receive the rotating drive force from the power generating unit. The rotary cam 124 is also tapered at a second end thereof such that the central portion of the second end of the rotary cam 124 becomes flat and projects toward the fixed cam 125, thus forming a tapered projection. The rotary cam 124 thus cooperates with the fixed cam 125.

In addition, the fold rotating mechanism preferably has a position sensing unit placed between the reduction gear assembly 123 of the power generating unit and the rotary cam 124. The position sensing unit is comprised of a sensing plate 123-1 and a sensing brush 123-2, and detects an open angle of the fold 102 relative to the main body 101 by sensing a rotated angle of the rotary cam 124 so as to output a stop signal to the motor 122 of the power generating unit to stop the operation of the motor 122 when the fold 102 reaches a predetermined angular position relative to the main body 101.

The fixed cam 125 is arranged such that the fixed cam 124 engages or disengages with or from the rotary cam 124 so as to selectively cooperate with the rotary cam 124. The fixed cam 125 is assembled with the camshaft 126 comprised of the boss 126-1 integrated with the boss shaft 126-2. In such a case, the fixed cam 125 and the camshaft 126 are axially movable in opposite directions relative to each other.

In a detailed description with reference to FIG. 5, the fixed cam 125 has a cylindrical shape, and has a tapered depression at a first end thereof such that the fixed cam 125 comes into frictional engagement with the rotary cam 124. The second end of the fixed cap 125 has an opening. At least one longitudinal key 125-1 is axially formed on the external surface of the fixed cam 125 while extending from the second end of the fixed cam 125 having the opening to a predetermined position.

The camshaft 126 comprised of the boss 126-1 integrated with the boss shaft 126-2 is fitted over the fixed cam 125.

The boss 126-1 of the camshaft 126 is a cylindrical body which is longer than the fixed cam 125, with a radial pin slot 126-3 formed at at least one predetermined position of a sidewall of the boss 126-1. A key guide groove 126-4 is axially formed on the internal surface of the boss 126-1 while axially extending from the pin slot 126-3 to a predetermined position, so that the key guide groove 126-4 movably engages with the longitudinal key 125-1 of the fixed cam 125. A pin P is inserted into the pin slot 126-3. In such a case, the width of the pin P is larger than that of the pin slot 126-3. The pin P inserted in the pin slot 126-3 thus stops the longitudinal key 125-1 of the fixed cam 125 at a predetermined position relative to the key guide groove 126-4 of the camshaft 126. In the present invention, two pin slots 126-3 are preferably formed at diametrically opposite positions of the sidewall of the boss 126-1 in an effort to accomplish a stable relative sliding movement of the fixed cam 125 and the camshaft 126.

A stopper 126-5 is formed on the internal surface of the boss 126-1, and limits the axial moving range of the fixed cam 124 relative to the camshaft 126. The stopper 126-5 thus prevents the elastic biasing member 140 from being excessively compressed to a level exceeding a predetermined reference level at which the elastic biasing member 140 is plastically deformed, during the axial relative sliding movement of the fixed cam 125 and the camshaft 126.

The boss shaft 126-2 extending from an end of the camshaft 126 has a noncircular cross-section, so that the camshaft 126 is not rotated relative to the second fixed hinge part 131. Therefore, the fixed cam 125 assembled with the camshaft 126 is not rotated regardless of a rotation of the rotary cam 124. In such a case, the boss shaft 126-2 having the noncircular cross-section is inserted into the boss shaft receiving slot 133 of the second fixed hinge part 131. Since the boss shaft receiving slot 133 has a cross-section corresponding to that of the boss shaft 126-2, it is possible to prevent the camshaft 126 from idly rotating relative to the second fixed hinge part 131 even when the rotary cam 124 is rotated. In the present invention, the cross-section of the boss shaft 126-2 may be preferably selected from a triangular cross-section, a rectangular cross-section, a hexagonal cross-section, a semicircular cross-section, and etc.

The elastic biasing member 140 is installed in the cavity of the camshaft 126 so as to elastically bias the fixed cam 125 and the camshaft 126 in opposite directions. The elastic support member 140 preferably comprises a compression coil spring made of a material having both high elastic strain and high restoring force. The elastic biasing force of the elastic support member 140 is higher than the rotating drive force of the power generating unit. Since the elastic support member 140 having such a high elastic biasing force biases the fixed cam 125 in the predetermined direction, the rotary and fixed cams 124 and 125 may engage with or disengage from each other.

In order to assemble the above-mentioned elements into a desired hinge apparatus, the motor 122 and the reduction gear assembly 123 of the power generating unit, the sensing plate 123-1 and the sensing brush 123-2 of the position sensing unit, and the rotary cam 124, the fixed cam 125 and the camshaft 126 of the power transmission unit are sequentially installed in the housing 121 of the rotary hinge part 120. A motor-operated fold rotating mechanism housed in the housing 121 is thus fabricated. In such a case, the fixed cam 125 is assembled with the camshaft 126 as follows. That is, after the elastic biasing member 140 is installed in the cavity of the camshaft 126, the fixed cam 125 is inserted into the cavity of the camshaft 126 such that the longitudinal keys 125-1 of the fixed cam 125 are aligned and engage with the key guide grooves 126-4 of the camshaft 126.

Thereafter, the housing 121 of the rotary hinge part 120 is fitted over the hinge sleeve 132 of the first fixed hinge part 130, so that the first end of the rotary hinge part 120 is hinged to the first fixed hinge part 130. In addition, the second end of the rotary hinge part 120 is hinged to the second fixed hinge part 131. In order to hinge the second end of the rotary hinge part 120 to the second fixed hinge part 131, the boss shaft 126-2 of the camshaft 126 is primarily pushed by the use of the fixed cam compressing device (not shown) in a direction where the elastic biasing member 140 is compressed. The camshaft 126 is thus axially moved inward relative to the fixed cam 125 until the boss shaft 126-2 is completely retracted into the housing 121. In such a case, the sliding axial movement of the camshaft 126 relative to the fixed cam 125 is limited within a predetermined range by the stopper 126-5 formed on the internal surface of the boss 126-1, so that it is possible to prevent the elastic biasing member 140 from being excessively compressed to a level exceeding the predetermined reference level at which the elastic biasing member 140 is plastically deformed. The rotary hinge part 120 with the retracted camshaft 126 is, thereafter, positioned such that the second end of the rotary hinge part 120 comes into contact with the inside end of the second fixed hinge part 131. The second end of the rotary hinge part 120 in the above state is pushed downward until the rotary cam 124 is horizontally aligned with the second fixed hinge part 131. At that time, the retracted boss shaft 126-2 of the camshaft 126 is elastically projected from the housing 121 by the restoring force of the compressed elastic biasing member 140 and is inserted into the boss shaft receiving slot 133 of the second fixed hinge part 131. The second end of the rotary hinge part 120 is thus completely hinged to the second fixed hinge part 131.

That is, after the second end of the rotary hinge part 120 is allowed to lean on the inside end of the second fixed hinge part 131, the second end of the rotary hinge part 120 is slowly pushed downward. The second end of the rotary hinge part 120 thus moves downward along the end surface of the second fixed hinge part 131 while the camshaft 126 compresses the elastic biasing member 140. At a time the rotary hinge part 120 is horizontally aligned with the second fixed hinge part 131 during the downward movement, the retracted boss shaft 126-2 of the camshaft 126 is elastically projected from the housing 121, and is inserted into the boss shaft receiving slot 133 of the second fixed hinge part 131.

Therefore, different from conventional hinge apparatuses in which a fixed cam must be continuously compressed by the use of a fixed cam compressing device until the second end of a rotary hinge part is horizontally aligned with a second fixed hinge part during a process of assembling a hinge apparatus, the hinge apparatus of the present invention is advantageous in that it is not necessary to compress the camshaft by the use of the fixed cam compressing device after placing the second end of the rotary hinge part against the inside end of the second fixed hinge part. Therefore, the elements of the hinge apparatus according to the present invention are easily and simply assembled into a single structure, and, furthermore, the rotary hinge part does not interfere with the fixed cam compressing device during the hinge apparatus assembling process, so that the assembling process is further simply and easily accomplished.

Figure 3:
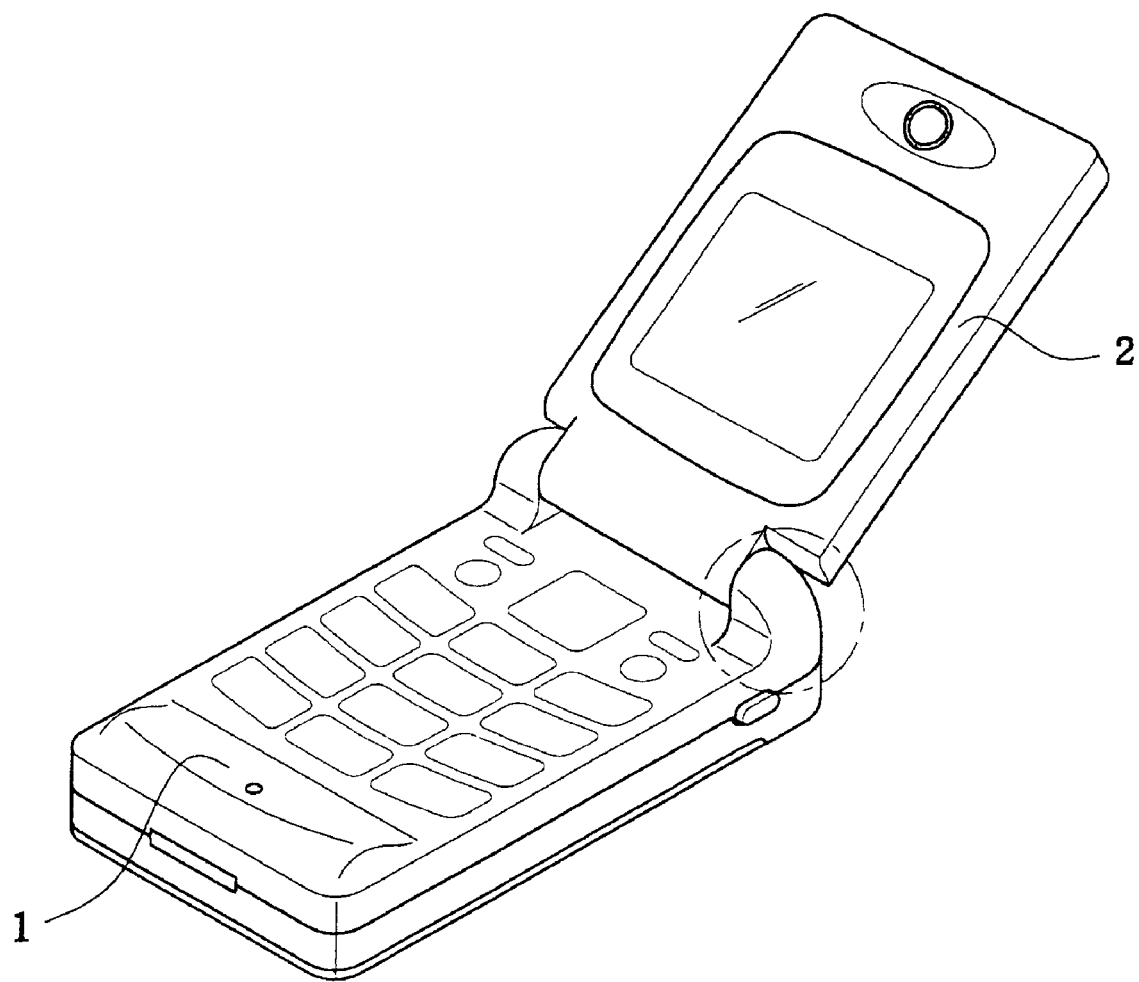
FIG. 3 is a perspective view of a folding-type mobile phone having a hinge apparatus, with two fixed hinge parts of the hinge apparatus designed to have a rounded appearance.

The hinge apparatus according to the first embodiment of the present invention allows a reduction in the lateral thickness of the second fixed hinge part to a desired level, so that it is possible to produce small-sized mobile phones. That is, the second fixed hinge part of the inventive hinge apparatus effectively accomplishes its hinge support function by the boss shaft receiving slot, so that the lateral thickness of the second fixed hinge part may be remarkably reduced by minimizing the size of the remaining part except for the boss shaft receiving slot. Alternatively, the lateral thickness of the second fixed hinge part according to the present invention may remain the same as that of a conventional hinge apparatus, however, in such a case, the design of the fixed hinge parts may be preferably changed, as shown in FIG. 3. It is thus possible to produce mobile phones having a variety of new designs accomplished by a change in the design of the fixed hinge parts. In a brief description, the hinge apparatus of the present invention allows production of mobile phones having many designs changeable due to design flexibility of the fixed hinge parts.

The hinge apparatus according to the first embodiment of the present invention allows a user to automatically or manually open or close the fold relative to the main body.

When the user manually opens or closes the fold 102 relative to the main body 101, the user rotates the fold 102 in a desired direction relative to the main body 101. In such a case, the rotary hinge part 120 of the fold 102 is rotated in the same direction as the rotation of the fold 102, so that the rotary cam 124 is rotated. The rotary and fixed cams 124 and 125 thus slip off, and the fixed cam 125 in such a state axially moves in the camshaft 126 while compressing the elastic biasing member 140, so that the fixed cam 125 disengages from the rotary cam 124 with a space defined between the two cams 124 and 125. Therefore, the rotary hinge part 120 is smoothly rotated, and the fold 102 is smoothly opened or closed.

When the user wants to automatically open the fold 102, the user manipulates the signal output unit of the main body 101, so that an electric signal is outputted to the power generating unit. In response to the electric signal, the motor 122 is turned on by electricity applied from the battery of the mobile phone, and is rotated in a direction to generate a desired directional rotating force. The rotating force of the motor 122 is transmitted to the rotary and fixed cams 124 and 125 while being lowered in the rotating speed by the reduction gear assembly 123. In such a case, the elastic biasing force of the elastic support member 140 is higher than the rotating drive force of the motor 122, so that the engagement of the rotary and fixed cams 124 and 125 is maintained. In addition, the boss shaft 126-2 of the camshaft 126 has a noncircular cross-section, and the boss shaft receiving slot 133 of the second fixed hinge part 131 receiving the boss shaft 126-2 has a cross-section corresponding to that of the boss shaft 126-2. Therefore, an idle rotation of the camshaft 126 relative to the second fixed hinge part 131 is prevented, and the fixed cam 125 assembled with the camshaft 126 is not rotated. The rotary hinge part 120 which fixedly houses the motor 122 is rotated by the rotating drive force of the motor 122, so that the fold 102 is automatically opened or closed.

The hinge apparatus according to the first embodiment of the present invention is advantageous in that the elements of the hinge apparatus are easily and simply assembled, and the fixed cam 125 is installed in the rotary hinge part 120, in place of the second fixed hinge part 131, different from conventional hinge apparatuses, and the camshaft 126 is axially moved relative to the fixed cam 125, so that the lateral thickness of the second fixed hinge part 131 may be desirably reduced or the design of the fixed hinge parts can be preferably changed.

Figure 6:
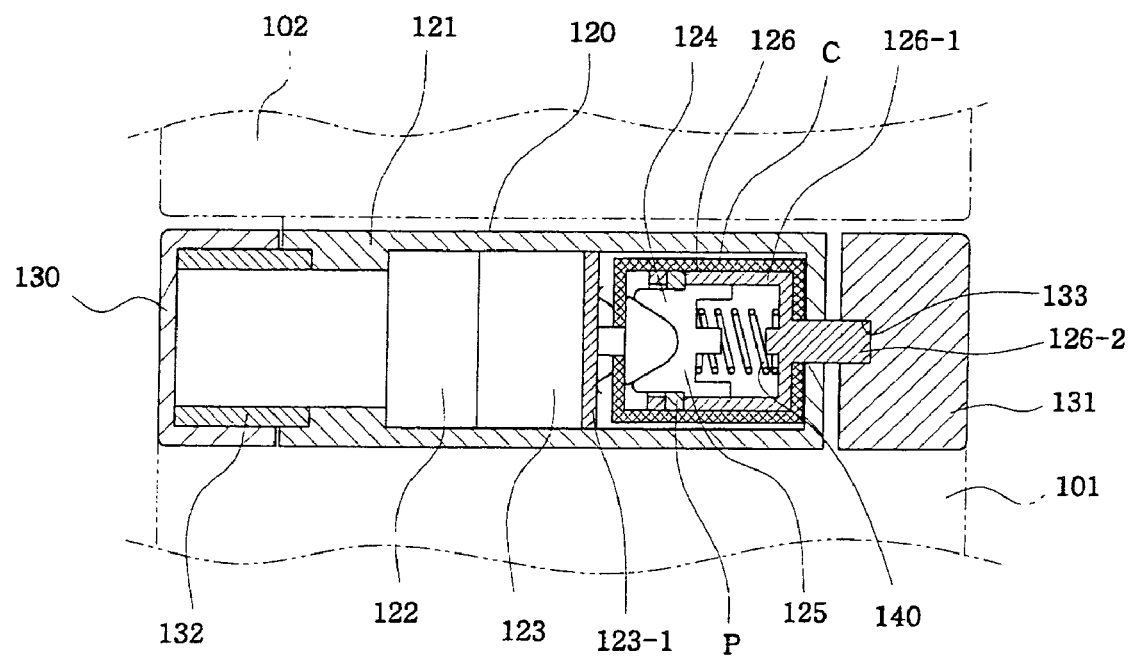
FIG. 6 is a sectional view of a hinge apparatus for folding-type mobile phones, according to a modification of the first embodiment of the present invention.

FIG. 6 is a sectional view of a hinge apparatus for folding-type mobile phones, according to a modification of the first embodiment of the present invention. As shown in the drawing, the general shape of the hinge apparatus according to the modification remains the same as the first embodiment, but the rotary cam 124, the fixed cam 125 and the camshaft 126 are set in a casing to form a module. That is, the rotary cam 124, the fixed cam 125 and the camshaft 126 are housed in the casing C of the module, so that the relative operation of the rotary cam 124, the fixed cam 125 and the camshaft 126 is performed inside the casing C. Therefore, even when the second end of the rotary hinge part 120 scratches the inside end surface of the second fixed hinge part 131 during the process of assembling the elements of the hinge apparatus, wobble of the elements due to scratches on the end surface of the second fixed hinge part 131 is preferably intercepted by the casing C. Therefore, it is possible to prevent degradation in the operational performance of the hinge apparatus and a formation of an undesired gap between the rotary hinge part 120 and the fixed hinge parts 130 and 131 caused by the wobble.

In the hinge apparatus according to the modification of the first embodiment, the pin P used for limiting an axial sliding movement of the fixed cam 125 may be removed, since the axial sliding movement of the fixed cam 125 can be limited by the casing C.

Figure 7:
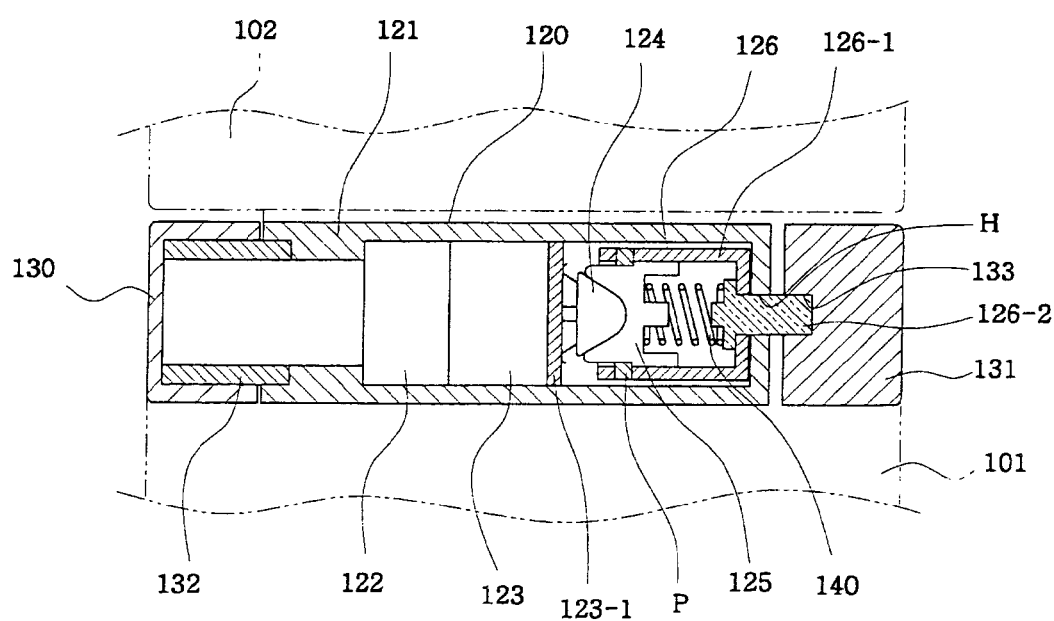
FIG. 7 is a sectional view of a hinge apparatus for folding-type mobile phones, according to a second embodiment of the present invention.
Figure 8:
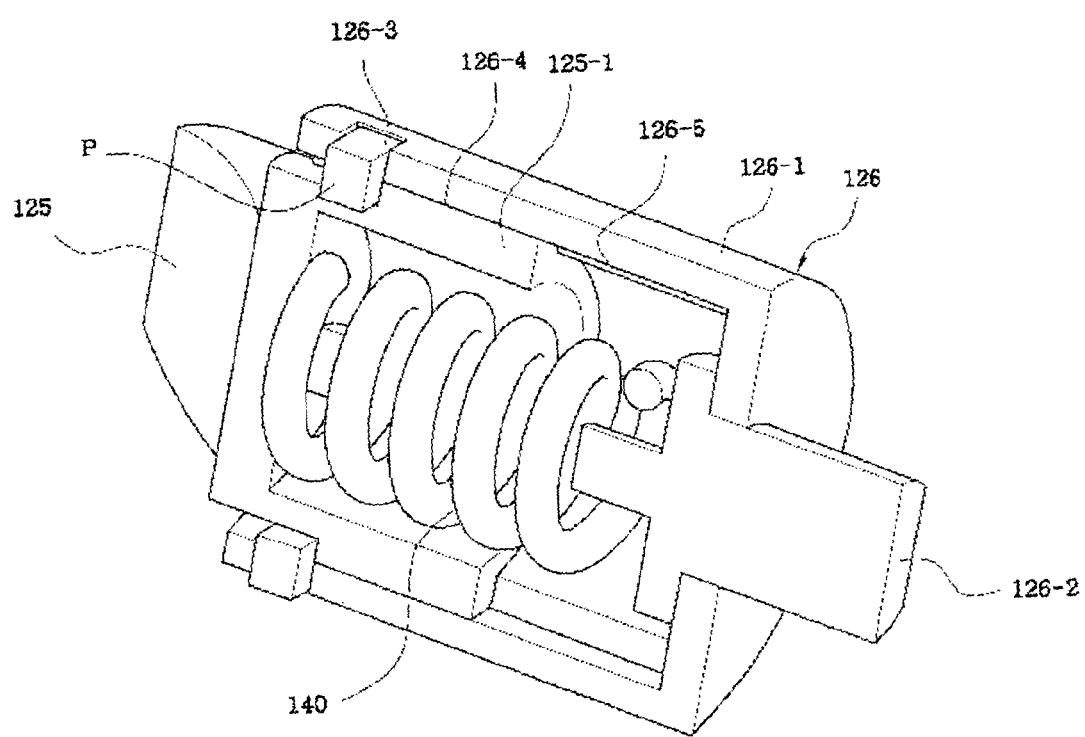
FIG. 8 is a sectional perspective view showing the construction and operation of a fixed cam and a camshaft assembled with each other in the hinge apparatus of FIG. 7.

FIGS. 7 and 8 are views of a hinge apparatus for folding-type mobile phones, according to a second embodiment of the present invention. As shown in the drawings, the general shape of the hinge apparatus according to the second embodiment remains the same as the first embodiment, but the boss 126-1 and the boss shaft 126-2 of the camshaft 126 are separated from each other, different from the integrated camshaft 126 of the first embodiment. The boss shaft 126-2 is inserted in a shaft hole H formed at an end of the boss 126-1. The boss shaft 126-2 has a noncircular cross-section, for example, a semicircular cross-section, and the shaft hole H of the boss 126-1 has a cross-section corresponding to that of the boss shaft 126-2. Therefore, an idle rotation of the boss 126-1 relative to the boss shaft 126-2 coupled to the second fixed hinge part 131 is prevented.

The hinge apparatus according to the second embodiment is advantageous in that both ends of the rotary hinge part 120 are hinged to the two fixed hinge part 130 and 131 while pushing only the boss shaft 126-2 during a process of assembling the elements into the hinge apparatus, so that it is easy to assemble the hinge apparatus.

Figure 9:
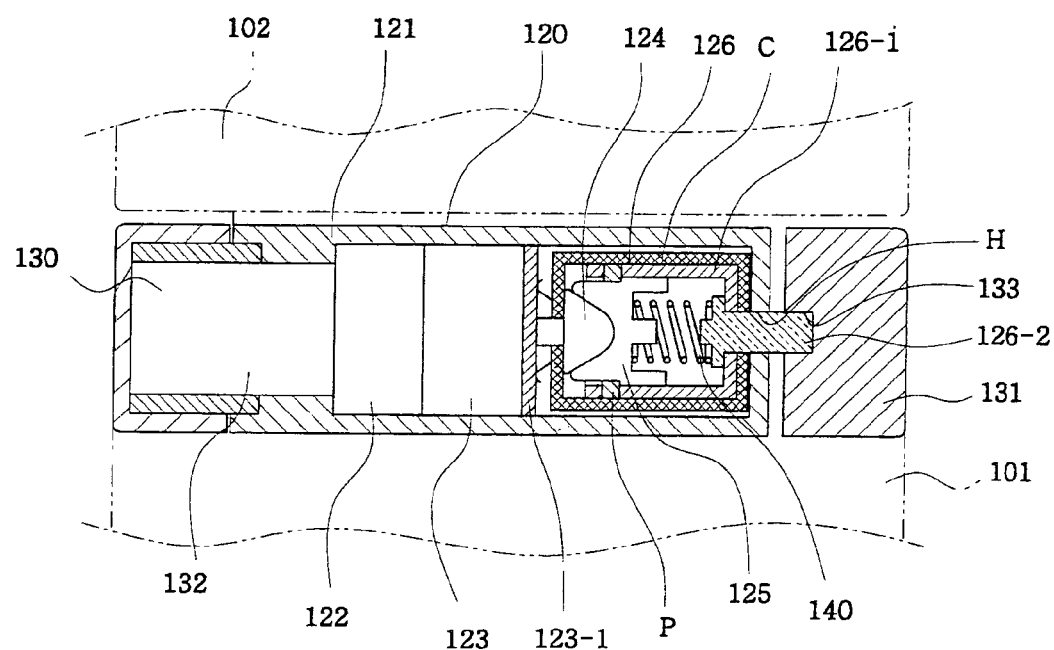
FIG. 9 is a sectional view of a hinge apparatus for folding-type mobile phones, according to a modification of the second embodiment of the present invention.

FIG. 9 is a sectional view of a hinge apparatus for folding-type mobile phones, according to a modification of the second embodiment of the present invention. As shown in the drawing, the general shape of the hinge apparatus according to the modification remains the same as the second embodiment, but the rotary cam 124, the fixed cam 125, the boss 126-1, and the boss shaft 126-2 are set in a casing C to form a module. Therefore, the relative operation of the rotary cam 124, the fixed cam 125 and the camshaft 126 is performed inside the casing C. Therefore, even when the second end of the rotary hinge part 120 scratches the inside end surface of the second fixed hinge part 131 during a process of assembling the elements of the hinge apparatus, wobble of the elements due to scratches on the end surface of the second fixed hinge part 131 is preferably intercepted by the casing C. It is thus possible to prevent degradation in the operational performance of the hinge apparatus and a formation of an undesired gap between the rotary hinge part 120 and the fixed hinge parts 130 and 131 caused by the wobble.

In the hinge apparatus according to the modification of the second embodiment, the pin P used for limiting an axial sliding movement of the fixed cam 125 may be removed, since the axial sliding movement of the fixed cam 125 can be limited by the casing C.

Figure 10:
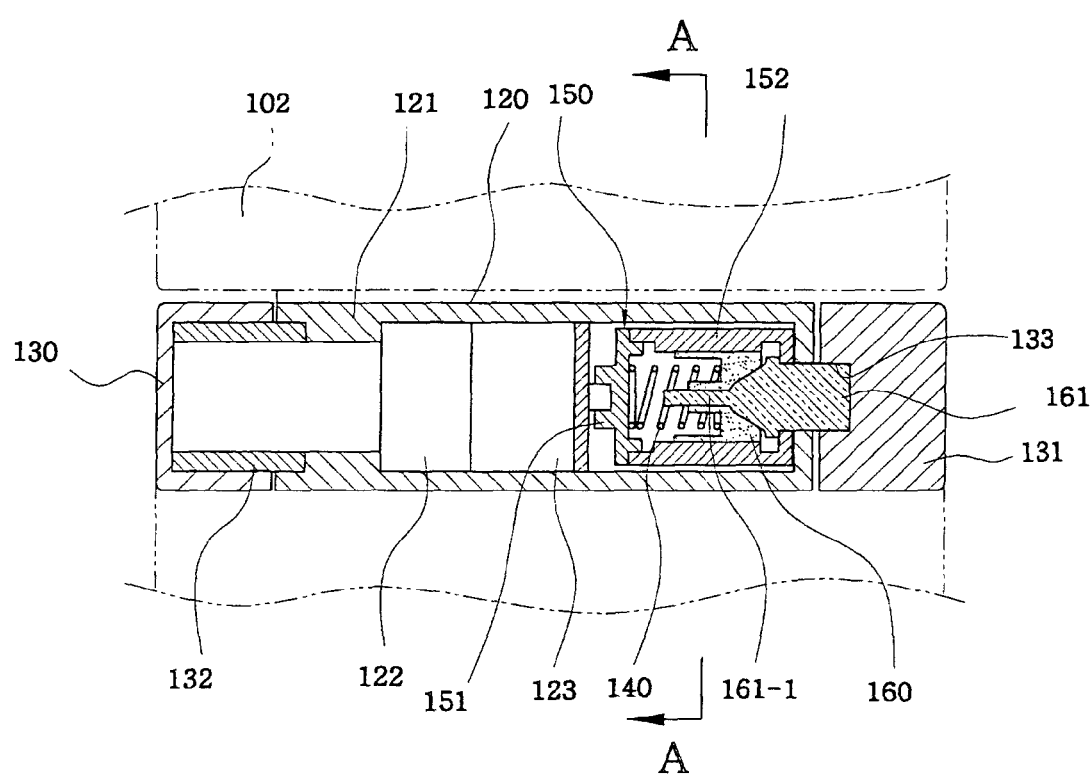
FIG. 10 is a sectional view of a hinge apparatus for folding-type mobile phones, according to a third embodiment of the present invention.

FIG. 10 is a sectional view of a hinge apparatus for folding-type mobile phones, according to a third embodiment of the present invention. As shown in the drawing, the hinge apparatus for folding-type mobile phones according to the third embodiment is comprised of two fixed hinge parts 130 and 131 provided at corners of an end of a main body 101 of a mobile phone, and a rotary hinge part 120 provided at an end of a fold 102 and hinged to the two fixed hinge parts 130 and 131 so as to accomplish a folding structure of the mobile phone. The rotary hinge part 120 is comprised of a power generating unit, a coupling unit 150, a rotary cam 160, a fixed cam 161, and an elastic biasing member 140. The power generating unit generates a rotating drive force, while the coupling unit 150 receives the rotating drive force from the power generating unit. The rotary cam 160 is assembled with the coupling unit 150 such that the rotary cam 160 is axially moved relative to the coupling unit 150, but is prevented from idly rotating relative to the coupling unit 150. The fixed cam 161 engages or disengages with or from the rotary cam 160, so that the two cams 160 and 161 selectively cooperate with each other. The fixed cam 161 is assembled with the second fixed hinge part 131 such that the fixed cam 161 is prevented from idly rotating relative to the second fixed hinge part 131. The elastic biasing member 140 is installed in a cavity of the coupling unit 150 so as to elastically bias the rotary cam 161 and the coupling unit 150 in opposite directions.

In a detailed description with reference to FIG. 10, the power generating unit of the hinge apparatus according to the third embodiment of the present invention is comprised of a motor 122 for generating the rotating drive force, and a reduction gear assembly 123 for transmitting the rotating drive force of the motor 122 while lowering the rotating speed, in the same manner as that described for the above-mentioned embodiments.

The power generating unit is assembled with the coupling unit 150 which receives the rotating drive force from the power generating unit, and transmits the rotating drive force. The coupling unit 150 is comprised of a coupler 151 and a boss 152. The coupler 151 receives the rotating drive force from the power generating unit. The boss 152 is assembled with the rotary cam 160 inside the coupling unit 150 such that the rotary cam 160 is axially moved relative to the boss 152, but is prevented from idly rotating relative to the boss 152, so that the boss 152 transmits the rotating drive force to the rotary cam 160. The coupler 151 and the boss 152 may be integrally formed as a single structure, or may be separately formed prior to being bonded or welded to each other into a single structure.

Figure 11:
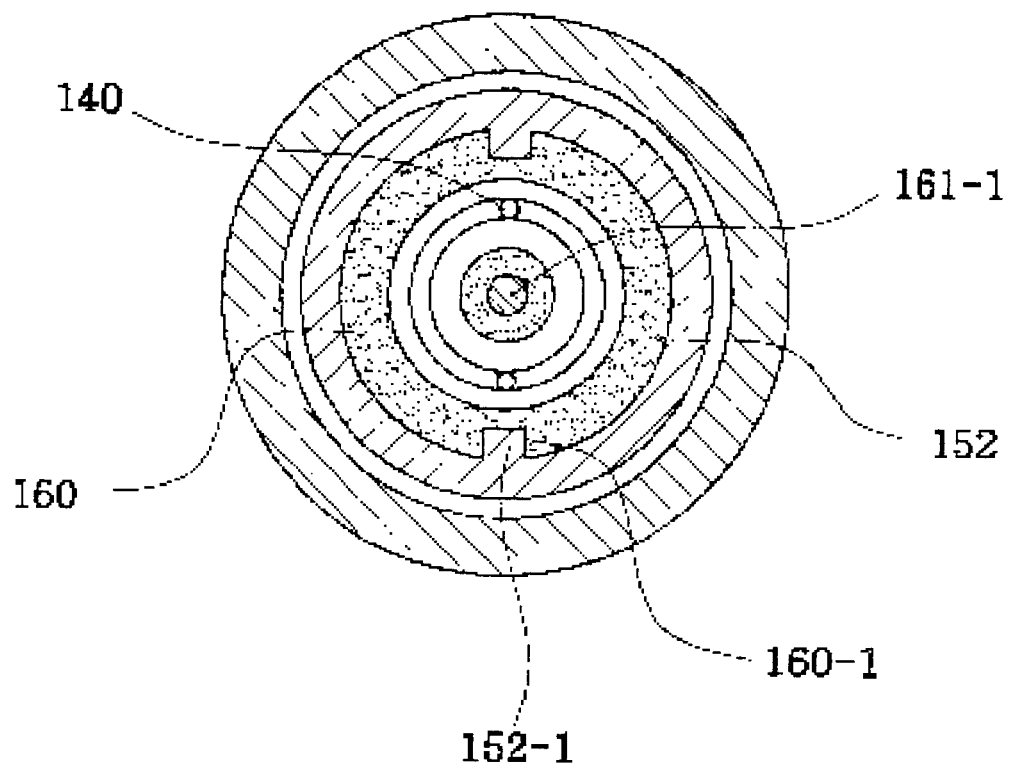
FIG. 11 is a sectional view of the hinge apparatus taken along the line A—A of FIG. 10.

In the coupling unit 150, the rotary cam 160 is assembled with the boss 152 such that the rotary cam 160 is axially moved relative to the boss 152, but is prevented from idly rotating relative to the boss 152. In order to accomplish the above-mentioned engagement of the rotary cam 160 with the boss 152, at least one longitudinal key 152-1 is axially formed on the internal surface of the boss 152, while at least one key guide groove 160-1 is axially formed on the external surface of the rotary cam 160, so that the key guide groove 160-1 movably engages with the longitudinal key 152-1, as shown in FIG. 11. Of course, it should be understood that the key guide groove may be formed on the internal surface of the boss 152, while the key may be formed on the external surface of the rotary cam 160, without affecting the functioning of the present invention.

The fixed cam 161 is installed in the hinge apparatus such that it engages or disengages with or from the rotary cam 160. The outside end of the fixed cam 161 passes through a hole of the boss 152, and is assembled with the second fixed hinge part 131 such that the fixed cam 161 is prevented from idly rotating relative to the second fixed hinge part 131.

The rotary cam 160 preferably has a cavity along a central axis thereof, while the fixed cam 161 preferably has a shaft 161-1 which is inserted into the cavity of the rotary cam 160. The shaft 161-1 acts as a rotating axis of the rotary cam 160, so that an eccentric rotation of the rotary cam 160 is prevented. The shaft 161-1 also prevents a plastic deformation of the elastic biasing member 140. That is, the inside end of the shaft 161-1 is stopped by the coupler 151 during an axial sliding movement of the fixed cam 161 when the elements are assembled into a hinge apparatus, so that the axial sliding movement of the fixed cam 161 is limited. Therefore, the shaft 161-1 prevents the elastic biasing member 140 from being excessively compressed to a level exceeding a predetermined reference level at which the elastic biasing member 140 is plastically deformed.

In the same manner as that described for the first embodiment, the hinge apparatus according to the third embodiment allows a user to automatically or manually open or close the fold relative to the main body.

When the user manually opens or closes the fold 102 relative to the main body 101, the user rotates the fold 102 in a desired direction relative to the main body 101. In such a case, the rotary hinge part 120 of the fold 102 is rotated in the same direction as the rotation of the fold 102, so that the coupling unit 150 is rotated. Since the rotary cam 160 is assembled with the coupling unit 150 such that an idle rotation of the rotary cam 160 relative to the coupling unit 150 is prevented, rotary cam 124 is rotated by the rotation of the coupling unit 150. Due to the rotation of the rotary cam 160, the rotary and fixed cams 160 and 161 slip off. In such a case, since the rotary cam 160 is axially movable relative to the coupling unit 150, the rotary cam 160 moves away from the fixed cam 161 in a direction at which the rotary cam 160 compresses the elastic biasing member 140. That is, the rotary cam 160 disengages from the fixed cam 161, and the rotary hinge part 120 is smoothly rotated. The fold 102 is thus smoothly opened or closed.

When the user wants to automatically open the fold 102, the user manipulates the signal output unit, so that an electric signal is outputted to the power generating unit. In response to the electric signal, the motor 122 is turned on by electricity applied from a battery of the mobile phone, and is rotated in a direction to generate a desired directional rotating force. The rotating force of the motor 122 is transmitted to the coupling unit 150 while being lowered in the rotating speed by the reduction gear assembly 123. In such a case, the elastic biasing force of the elastic support member 140 which biases the coupler 151 is higher than the rotating drive force of the motor 122, so that the coupling unit 150 is maintained at a stop position thereof. Therefore, the rotary hinge part 120 which fixedly houses the motor 122 is rotated by the rotating drive force of the motor 122, so that the fold 102 is automatically opened or closed.

The hinge apparatus according to the third embodiment is advantageous in that the elements of the hinge apparatus are easily and simply assembled. In order to assemble the above-mentioned elements into a desired hinge apparatus, the motor 122 and the reduction gear assembly 123 of the power generating unit, the coupling unit 150, the elastic biasing member 140, the rotary cam 160, and the fixed cam 161 are sequentially installed in the housing 121 of the rotary hinge part 120. The rotary hinge part 120 housed in the housing 121 is thus fabricated.

Thereafter, the housing 121 of the rotary hinge part 120 is fitted over the hinge sleeve 132 of the first fixed hinge part 130, so that the first end of the rotary hinge part 120 is hinged to the first fixed hinge part 130. In addition, the second end of the rotary hinge part 120 is hinged to the second fixed hinge part 131. In order to hinge the second end of the rotary hinge part 120 to the second fixed hinge part 131, the projected end of the fixed cam 161 is primarily pushed by the use of a fixed cam compressing device (not shown) in a direction where the fixed cam 161 pushes the rotary cam 160. The rotary cam 160 thus axially moves relative to the boss 152 of the coupling unit 150 while compressing the elastic biasing member 140. In such a case, the shaft 161-1 of the fixed cam 161 limits the axial movement of the rotary cam 160, so that it is possible to prevent the elastic biasing member 140 from being excessively compressed to a level exceeding the predetermined reference level at which the elastic biasing member 140 is plastically deformed.

The rotary hinge part 120 with the retracted fixed cam 161 is, thereafter, placed against the inside end of the second fixed hinge part 131, and is pushed downward until the fixed cam 161 is horizontally aligned with the second fixed hinge part 131. At that time, the retracted fixed cam 161 is elastically projected from the housing 121 by the restoring force of the compressed elastic biasing member 140, and is inserted into the boss shaft receiving slot 133 of the second fixed hinge part 131. The second end of the rotary hinge part 120 is thus completely hinged to the second fixed hinge part 131.

Therefore, the hinge apparatus according to the third embodiment is advantageous in that it is easy to assemble the elements into a desired hinge apparatus. In addition, the lateral thickness of the fixed hinge parts may be remarkably reduced to a desired level, or the design of the fixed hinge parts may be preferably changed.

Figure 12:
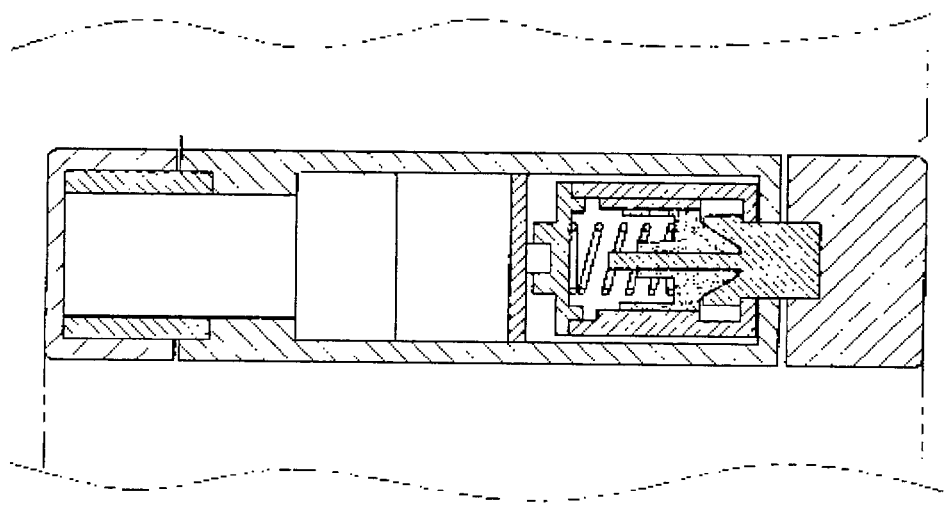
FIG. 12 is a sectional view of a hinge apparatus for folding-type mobile phones, according to a modification of the third embodiment of the present invention.

FIG. 12 is a sectional view of a hinge apparatus for folding-type mobile phones, according to a modification of the third embodiment of the present invention. The general shape of the hinge apparatus according to the modification of the third embodiment remains the same as that of the third embodiment of FIG. 10, but the shapes of the rotary cam and the fixed cam are changed to be opposed to those of the third embodiment. The operational effect of the hinge apparatus according to this modification is similar to that of the third embodiment, and further explanation is thus not deemed necessary.

As described above, the present invention provides a hinge apparatus for mobile phones, which is easily and simply assembled. The elements of the hinge apparatus do not interfere with each other during a process of assembling the hinge apparatus. Another advantage of the inventive hinge apparatus resides in that the lateral thickness of the fixed hinge parts may be remarkably reduced to a desired level to accomplish a desired reduction in the size of mobile phones, or the design of the fixed hinge parts may be preferably changed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A hinge apparatus for connecting a fold and a main body of a mobile phone to each other, comprising:
   a fixed hinge part provided at said main body; and
   a rotary hinge part provided at said fold and hinged to said fixed hinge part so to be rotated relative to the fixed hinge part, said rotary hinge part comprising:
   a power generating unit generating a rotating drive force;
   a rotary cam and a fixed cam selectively performing power transmission of the rotating drive force of the power generating unit;
   a camshaft assembled with the fixed cam such that the camshaft and the fixed cam are axially movable relative to each other, said camshaft being connected at an end thereof to the fixed hinge part such that an idle rotation of the camshaft relative to the fixed hinge part is prevented; and
   an elastic biasing member provided in said camshaft to elastically bias the fixed cam and the camshaft in opposite directions;
   wherein the camshaft includes:
   a boss assembled with the fixed cam such that the boss and the fixed cam are axially movable relative to each other; and a boss shaft integrated with the boss into a single structure, said boss shaft being received in a boss shaft receiving slot of the fixed hinge part, so that an idle rotation of the boss shaft relative to the fixed hinge part is prevented; and wherein a key guide groove is formed on an internal surface of the boss, and a key is formed on an external surface of the fixed cam, said key movably engaging with the key guide groove, so that the boss and the fixed cam are axially movable relative to each other.

2. The hinge apparatus according to claim 1, wherein a pin slot is formed at the boss, and a pin having a width larger than a width of the pin slot is inserted into the pin slot, so that an axial movement of the fixed cam is limited.

3. A hinge apparatus for connecting a fold and a main body of a mobile phone to each other, comprising:

a fixed hinge part provided at said main body; and a rotary hinge part provided at said fold and hinged to said fixed hinge part so to be rotated relative to the fixed hinge part, said rotary hinge part comprising:

a power generating unit generating a rotating drive force;

a coupling unit receiving the rotating drive force of the power generating unit;

a rotary cam assembled with the coupling unit such that the rotary cam and the coupling unit are axially movable relative to each other, but are prevented from idly rotating relative to each other;

a fixed cam engaging with or disengaging from the rotary cam, and assembled at an end thereof with the fixed hinge part such that the fixed cam is prevented from idly rotating relative to the fixed hinge part; and an elastic biasing member provided in said coupling unit to elastically bias the rotary cam and the coupling unit in opposite directions;

wherein the coupling unit includes:

a coupler receiving the rotating drive force of the power generating unit; and a boss assembled with the rotary cam such that the rotary cam and the boss are axially movable relative to each other, but are prevented from idly rotating relative to each other, so that the boss transmits the rotating drive force to the rotary cam; and wherein a key is formed on an internal surface of the boss, and a key guide groove is formed on an external surface of the rotary cam, said key movably engaging with the key guide groove.

4. A hinge apparatus for connecting a fold and a main body of a mobile phone to each other, comprising:

a fixed hinge part provided at said main body; and a rotary hinge part provided at said fold and hinged to said fixed hinge part so to be rotated relative to the fixed hinge part, said rotary hinge part comprising:

a power generating unit generating a rotating drive force;

a coupling unit receiving the rotating drive force of the power generating unit;

a rotary cam assembled with the coupling unit such that the rotary cam and the coupling unit are axially movable relative to each other, but are prevented from idly rotating relative to each other;

a fixed cam engaging with or disengaging from the rotary cam, and assembled at an end thereof with the fixed hinge part such that the fixed cam is prevented from idly rotating relative to the fixed hinge part; and an elastic biasing member provided in said coupling unit to elastically bias the rotary cam and the coupling unit in opposite directions;

wherein the coupling unit includes:

a coupler receiving the rotating drive force of the power generating unit; and a boss assembled with the rotary cam such that the rotary cam and the boss are axially movable relative to each other, but are prevented from idly rotating relative to each other, so that the boss transmits the rotating drive force to the rotary cam; and wherein a key guide groove is formed on an internal surface of the boss, and a key is formed on an external surface of the rotary cam, said key movably engaging with the key guide groove.

* * * * *